United States Patent Office 3,549,548
Patented Dec. 22, 1970

3,549,548
METHOD OF INHIBITING SCALE FORMATION USING A CONDENSED POLYPHOSPHATE-PARTIALLY HYDROLYZED POLYACRYLONITRILE COMPOSITION
Theodore R. Newman, Oak Lawn, Ill., assignor to Nalco Chemical Company, Chicago, Ill., a corporation of Delaware
No Drawing. Continuation-in-part of application Ser. No. 574,897, Aug. 25, 1966. This application Nov. 22, 1968, Ser. No. 778,309
Int. Cl. C02b 5/04, 5/06; C08f 3/76
U.S. Cl. 252—181     14 Claims

ABSTRACT OF THE DISCLOSURE

A process for preventing the formation of scale on the internal walls of cooling water systems and the like. In the process a composition comprising in combination a condensed polyphosphate and particular acrylic polymers is added to the aqueous system to be treated. The particular acrylic polymers contain both amide and carboxyl side groups in a ratio of from one to four amide groups per six to nine carboxyl groups. The molecular weight of the polymer will be up to 40,000.

---

This application is a continuation-in-part of application Ser. No. 574,897, filed Aug. 25, 1966 and now abandoned.

The present invention relates to a method of preventing formation of scale and materials useful therein. More specifically, the instant invention relates to compositions useful in inhibiting precipitation of scale-forming elements from water in such industrial systems as cooling waters and the like, and their mode of use.

The problem of scale formation and attendant effects has been a serious one for a number of years. The scale tends to accumulate on the internal walls of various systems such as cooling water systems, etc., thereby materially lessening their operational efficiency. For example, in a cooling water system gross accumulation of scale tends to cut down substantially on heat transfer.

A number of treatments have been proposed to counteract the above, as for example, addition of chemicals to maintain the scale-forming elements in suspension. However, none of these has proved to be completely effective. Also, in many instances, relatively large amounts of additives must be employed to effectively treat the system undergoing control and thereby prevent scale formation.

In view of the above, it therefore becomes an object of the invention to inhibit precipitation of scale-forming elements from aqueous systems.

More specifically, an object of the invention is to prevent formation of scale in such operations as cooling water systems and the like by treatment with a particularly effective composition.

Other objects will appear hereinafter.

In accordance with the invention, I have discovered a surprisingly efficient method of inhibiting precipitation of scale-forming elements from water. Broadly speaking, the invention comprises treating water having a tendency to deposit scale with a synergistic composition comprising in combination a condensed polyphosphate and a specific polymeric system. The combination of ingredients yields a greater result than the additive effect of the individual components. The method of the invention can be used to treat any aqueous system which tends to deposit scale on equipment in contact with said water.

The invention is particularly applicable to the treatment of once-through and recirculating cooling water and oil producing and water flood systems, thereby preventing scale deposits in these systems. However, the invention is not limited to treatment of such systems and may be employed in conjunction with a wide variety of industrial processes involving use of hard water. For example, another application would involve treatment of distillation equipment being employed to purify sea water by various desalination methods. Again, the invention may also be used in the prevention of scale deposits in certain effluent and disposal waters, particularly where other materials used in preventing of such deposits may constitute a pollution problem.

The exact mode of operation of the invention is not fully understood. However, it is believed that the treatment tends to distort the growing crystal latices of hardness elements such as magnesium and calcium, thereby preventing further growth. Thus, such materials as calcium carbonate, calcium phosphate, calcium sulfate, barium sulfate, magnesium carbonate, magnesium phosphate, etc., are maintained in a dispersed condition in aqueous systems, and are not allowed to accumulate to the point of visible precipitation. Scaling, that is precipitation of the hardness elements, is substantially prevented, or inhibited to a great degree. The compositions disclosed herein are particularly effective against calcium carbonate precipitation.

Yet another application of the invention involves the use of the synergistic composition to treat injection brines used in secondary recovery of oil fields. In this mode of operation, the produced fluid from a secondary recovery operation is generally combined with another source of water. In many instances, deleterious precipitation occurs upon such combination. By treatment with the materials of the invention precipitation is substantially inhibited. Again, produced fluids from a water-flooding operation are usually heated to resolve the oil and brine phases. Without benefit of control substantial precipitation occurs in the heater. Again, by application of the combination of materials disclosed herein, such precipitation is prevented.

The compositions of the invention operate to prevent the above discussed scale formation at especially low dosages. For example, excellent results have been obtained when water is treated with said compositions in an amount of .1–100 p.p.m. and more preferably 0.5–10.0 p.p.m.

With more particular regard to the ingredients of the invention, condensed polyphosphates are well known materials and need little further elaboration. Such materials are generally formed by condensing phosphoric acid and neutralizing with ammonium hydroxide or alkali metal hydroxides to form salts thereof.

Representative condensed phosphoric acids, useful in making the condensed polyphosphate ingredient, include the metaphosphoric acids having the general formula $$(HPO_3)_n$$

where $n$ is an integer generally in the range of 2 to 100 or even higher, such as dimetaphosphoric acid,

trimetaphosphoric acid, $H_3P_3O_9$, tetrametaphosphoric acid, $H_4P_4O_{12}$, hexametaphosphoric acid, $H_6P_6O_{18}$, etc.; the polyphosphoric acids having the general formula

where $n$ is an integer generally in the range of 2 to 100 or higher, such as pyrophosphoric acid, $H_4P_2O_7$, triphosphoric acid, $H_5P_3O_{10}$, tetraphosphoric acid, $H_6P_4O_{13}$, etc., and mixtures thereof. These acids are conveniently prepared by molecularly condensing or dehydrating orthophosphoric acid, $H_3PO_4$.

Representative ammonium and alkali metal salts of condensed phosphoric acids, useful in the practice of this invention, include ammonium pyrophosphate (NH$_4$)$_4$P$_2$O$_7$ diammonium hydrogen pyrophosphate, (NH$_4$)$_2$P$_2$O$_7$; ammonium tetrametaphosphate, (NH$_4$)$_4$O$_{12}$; tetrasodium pyrophosphate, Na$_4$P$_2$O$_7$; hexametasodium phosphate, Na$_6$P$_6$O$_{18}$; sodium acid pyrophosphate, Na$_2$H$_2$P$_2$O$_7$; sodium tripolyphosphate, Na$_5$P$_3$O$_{10}$; potassium tetrametaphosphate, K$_4$P$_4$O$_{12}$; lithium trimetaphosphate, Li$_3$P$_3$O$_9$; etc.; and mixtures thereof.

I have found that for best results the acrylic polymers and copolymers employed in the method of the invention must be rather specific in nature. More particularly, the molecular weight of the polymer will be up to 40,000, and preferably from 800 to 30,000, and more preferably from 1,000 to 20,000. Molecular weight ranges of from 5,000 to 40,000, 10,000 to 30,000, and 15,000 to 20,000 have also been used with success. Also, the polymer should include amide and carboxyl side groups in a ratio of from one to four amide groups per six to nine carboxyl groups. If the polymer does not conform to this description, precipitation of scale is actually enhanced. It is important, therefore, that the polymers be carefully tailored in accordance with the disclosure herein.

The polymers of the invention can be prepared via a number of known techniques. For example, monomer mixtures comprising 10–40% acrylic acid or methacrylic acid and 60–90% acrylamide or methacrylamide may be prepared and copolymerized in the usual manner. Likewise, the acrylamide or methacrylamide may be copolymerized with sodium acrylate or methacrylate to yield useful polymers. It has been determined that polymers useful in this method may contain either free carboxyl groups or carboxylic alkali metal or ammonium salts. Thus, by the term "carboxyl groups" is meant either the free carboxylic acid group or partially or completely neutralized salts thereof.

One excellent way of forming useful polymers of proper molecular weight range and proportions of amide and carboxyl groups is effected by polymerization of acrylonitrile or methacrylonitrile followed by partial hydrolysis. The following example illustrates a typical synthesis of polymers useful in the present invention.

EXAMPLE 1

This example shows a suitable process for preparing polyacrylonitrile. The ingredients that were used in the process include the following:

| Ingredient: | Parts by weight |
|---|---|
| Acrylonitrile | 14.7 |
| Water (deionized) | 51.0 |
| 10% ammonium persulfate solution | 6.9 |
| 10% sodium bisulfite solution | 27.4 |
| Total | 100.0 |

The acrylonitrile and water were mixed together in a flask equipped with an agitator, thermometer, and condenser and warmed to 50° C. The ammonium persulfate solution was added to the mixture and two minutes later the sodium bisulfite solution was added. Initiation of polymerization occurred almost immediately. The temperature, which had dropped to 45° C., was allowed to rise at 1.5–2.0 degrees/min. up to 64° C. with partial cooling. The reaction mixture was then cooled and maintained at 55° C. for 3½ hours. The solution was then heated to 80° C. for one-half hour under slight vacuum to remove traces of unreacted acrylonitrile.

There are several methods that can be used to hydrolyze the polyacrylonitrile. Probably the best method is to hydrolyze the polyacrylonitrile slurry with sodium hydroxide in an aqueous medium. One of the problems involved in this procedure is due to the high viscosity level that is reached during the initial stage of the hydrolysis. In order to avoid this difficulty, the polyacryolnitrile can be added to the hydrolyzing medium over a 50–90 minute period. In an illustrative hydrolysis treatment, 24.4 parts by weight of a 50% NaOH solution was placed in a clean reaction vessel equipped with a stirrer, thermometer, and reflux condenser and heated to 90° C. One hundred (100) parts by weight of a 14.7% polyacrylonitrile slurry in water was then fed continuously to the reaction vessel over a 50 minute period. After the last portion of polyacrylonitrile was added, the reaction was heated at 90–100° C. At regular intervals, samples were withdrawn, cooled rapidly to room temperature, and submitted for evaluation. Optimum properties were obtained with material that was hydrolyzed for 2.5–5.0 hours. Length of hydrolysis is dependent on temperature. Analysis by infrared indicated that the best products were composed of 10–40% amide and 60–90% carboxyl groups. The same is true where the polymer is prepared by a copolymerization reaction such as by the copolymerization of acrylic acid and acrylamide.

The following table (Table 1) shows the reaction conditions used in preparing polyacrylonitriles of various molecular weights.

TABLE 1.—SYNTHESIS OF POLYACRYLONITRILES OF VARIOUS MOLECULAR WEIGHTS

| | Ingredients (by weight) | | | | Reaction conditions | | | |
|---|---|---|---|---|---|---|---|---|
| | ACN | H$_2$O | (NH$_4$)$_2$S$_2$O$_8$ | Na$_2$S$_2$O$_5$ | Temp., °C. | Time, hours | Intrinsic viscosity | Molecular weight |
| Product No.: | | | | | | | | |
| 1 | 265 | 1,680 | 13.8 | 55.2 | 50–55 | 4 | 0.40 | 19,500 |
| 2 | 265 | 1,680 | 13.8 | 55.2 | 50–55 | 3 | 0.385 | 18,500 |
| 3 | 265 | 1,680 | 13.8 | 55.2 | 55 | 3.5 | 0.378 | 18,000 |
| 4 | 265 | 1,680 | 13.8 | 55.2 | 70–90 | 1.5 | 0.297 | 13,000 |

The mol ratio of caustic to acrylonitrile that is used in the hydrolysis is important in determining the extent and rate of hydrolysis. Table 2 shows the composition of products hydrolyzed for 17 to 19 hours using less than the theoretical amount of sodium hydroxide.

TABLE 2.—EFFECT OF CAUSTIC CONCENTRATION ON HYDROLYSIS OF POLYACRYLONITRILE

| | Mols NaOH per mol acrylonitrile | Hydrolysis time, hrs. | Composition | | |
|---|---|---|---|---|---|
| | | | CN | CONH$_2$ | CO$_2$H |
| 1 | 0.6 | 17 | | 32 | 68 |
| 2 | 0.7 | 17 | | 32 | 68 |
| 3 | 0.9 | 17 | | 29 | 71 |

In producing the product, molecular weights are determined by measuring intrinsic viscosity. The following procedure can be used for this purpose:

Polyacrylonitrile is dissolved in dimethyl formamide at room temperature. Ten (10) mls. of solution is added by pipette to a Cannon-Ubbelohde viscometer and the time required for a standard volume to pass through the capillary is measured. Concentrations of solution are chosen so that the initial time is greater than 500 sec. The concentration of polyacrylonitrile in DMF is decreased to .67, .50, .40, and .25 times the initial concentration. The time required for these solutions to pass through the capillary is measured. Specific viscosity is calculated according to the following formula:

$$\eta_{sp} = \frac{t_p - t_s}{t_s}$$

where $\eta_{sp}$ = specific viscosity $t_p$ = time for polymer solution to pass through capillary
$t_s$ = time for solvent to pass through capillary Intrinsic viscosity was obtained by graphing $$\eta_{sp}/C \text{ vs. } C$$

where C = concentration and extrapolating to 0 concentration.

Molecular weight was calculated from the Staudinger equation:

$$n = kM^d$$

where $k$ and $d$ are constants.

$n$ = intrinsic viscosity
and M = molecular weight for polyacrylonitrile, $$K = 2.43 \times 10^{-4}$$

and $d = 0.75$

Determining product composition

Product composition can be determined by infrared analysis by comparison of carboxylate vs. amide lines or by titration with strong acid. Of the two procedures, infrared analysis is more rapid and was used in this work.

Standards were obtained by polymerizing recrystallized acrylamide and distilled acrylic acid in aqueous solution as homopolymers. The polyacrylic acid was neutralized with $CO_2$ free sodium hydroxide and then mixtures of known composition were prepared from the sodium polyacrylate and the acrylamide. The mixture was then cast on an Irtran-2 plate and run on the IR-9. The relative heights of the 1575 and 1675 cm.$^{-1}$ peaks were compared at acrylic acid:acrylamide ratios of 90:10, 80:20, 70:30, 60:40, 50:50, 40:60, 30:70, 20:80, 10:90 and used to estimate composition of the hydrolyzed polyacrylonitriles.

The components making up the compositions of the invention may be separately applied to water susceptible to scale formation or applied in combination at the same time. Equally effective results are achieved in both situations. In the most preferred embodiment an aqueous solution containing both polyphosphate and polymer is utilized. Again, the compositions may be used as treatment aids in the form of dry powder or in any other physical condition.

For optimum results, the ratio of phosphate to polymer in the compositions should range about 10:1 to 1:10 and most preferably from 5:1 to 1:5.

The following illustrates the surprising effectiveness of the compositions of the invention in preventing scale formation. In the test work the following procedure was employed.

Stainless test tube specimens were sandblasted for 10 minutes at 60 lbs. air pressure. The sand was then brushed and air-dried. The tubes were then passivated by immersing them for 5 minutes in 10% nitric acid at room temperature. The test specimens were then rinsed in deionized water, dipped in hot deionized water, rinsed with acetone and then air-dried. The tubes were dried for 1–2 hours at 180° F. At the end of this period of time, they were removed from the oven, were allowed to reach room temperature and then weighted to the nearest 0.1 mgs. The specimens were then ready for use in the test described below. After employment in the test procedure the specimens were again dried at 180° F. for 4 hours before reweighing. The heating and weighing were repeated until constant weight within 0.2 mgs. was obtained.

The water used in the stabilization test had an approximate analysis as follows:
Total hardness (as $CaCO_3$)—400–410 p.p.m.
Calcium hardness (as $CaCO_3$)—250 p.p.m.
Magnesium hardness (as $CaCO_3$)—150 p.p.m.
Total alkalinity (as $CaCO_3$)—270–285 p.p.m.
Sodium chloride—500
Sodium sulfate—1400
pH—8.0±0.1

In the test method sufficient water is prepared in a single batch for all tests. The hardness, alkalinity and pH are adjusted as needed. One liter of water is prepared for each test by additional treatment from a stock solution. The weighted specimens discussed above are then inserted into the test apparatus. The temperature of the water during the test period of 20 hours should range between 135° F. and 145° F. With each series of tests a blank or untreated test is run. The percent reduction in deposit weight over the blank due to chemical treatment is calculated by substracting the deposit weight of the treated test from the blank deposit weight, dividing this figure by the blank deposit weight and multiplying by 100. After the test is completed the temperature, pH, etc., of the water are determined to see if such variables were held within the limits set. Generally, the deposit weight in an untreated test ranges between 20 and 35 mgs.

The apparatus itself used in the test consists of a series of beakers containing suspended test specimens and heating unit. Each beaker is connected to a source of make-up water in an adjacent bottle. The water flows intermittently during the test from bottle to beaker through electrically operated and timed solenoid valves. The feed cycle can be varied from .05 to 5 minutes to alter the holding time index. Also, the impulse time which controls the volume of make-up water for each cycle can be changed from .05 to 3 seconds to vary the holding time index. Normally, the cycle is once every 15 minutes with an impulse of 0.5 seconds. This gives a holding time index (treatment half-life) of about 15 hours with the particular solenoid valves employed.

The make-up water flows into the test beakers near the bottom of the beakers by means of discharge tubes. The water overflows from side arms in beakers to a waste collection system. The volume of water in each test vessel is maintained at 275 ml. The heaters are rated at 75 watts and are controlled by rheostats located at the right side of the unit. Test specimens are placed over the heaters and attached to the cover plate by means of Swagelock fittings and Teflon washers. The water in the test beakers is stirred by means of Teflon covered stirring bars. The stirring is accomplished by motor and chain driven magnets located in the base of such units. The rotation speed is about 180 r.p.m.

The following table demonstrates the dramatic and surprising activity of the compositions of the invention in stabilizing against calcium carbonate hardness precipitation. In each instance the figures presented represent an average of 10 tests.

TABLE 3

| Dosage: | Percent activity |
| --- | --- |
| 1 p.p.m. polyphosphate | 85 |
| 1 p.p.m. hydrolyzed polyacrylonitrile | 75 |
| ¾ p.p.m. polyphosphate and ¼ p.p.m. hydrolyzed polyacrylonitrile | 92 |
| ½ p.p.m. polyphosphate and ½ p.p.m. hydrolyzed polyacrylonitrile | 85 |
| ¼ p.p.m. polyphosphate and ¾ p.p.m. hydrolyzed polyacrylonitrile | 90 |
| ½ p.p.m. polyphosphate | 60 |
| ½ p.p.m. hydrolyzed polyacrylonitrile | 0 |

As can be seen from the above experimental data the combination of the components making up the compositions of the invention yield more than an additive result in preventing hardness precipitation compared to the sum total of the individual materials.

Obviously, many modifications and variations of the invention as hereinbefore set forth may be made without departing from the spirit and scope thereof, and there- The invention is hereby claimed as follows:

1. A method of inhibiting precipitation of scale-forming elements from water which consists essentially of the steps of treating said water with at least an effective amount of a synergistic stabilizing composition comprising a condensed ammonium or alkali metal phosphate and an acrylic polymer having a molecular weight of up to 40,000 and having amide and carboxyl groups in a ratio of one to four amide groups per six to nine carboxyl groups, with the weight ratio of said polyphosphate to said polymer in said composition ranging from about 10:1 to about 1:10.

2. The method of claim 1 wherein said ratio is from about 5:1 to about 1:5.

3. The method of claim 1 wherein said polymer has a molecular weight of from 800 to 30,000.

4. The method of claim 1 wherein said polymer has a molecular weight of from 5,000 to 40,000.

5. The method of claim 1 wherein said polymer is a hydrolyzed polyacrylonitrile having a molecular weight of from 800 to 40,000.

6. The method of claim 1 wherein said polymer contains methyl groups as well as said amide and carboxyl groups.

7. The method of claim 1 wherein said water is treated with said composition in an amount of 0.5–10 p.p.m.

8. A method of inhibiting precipitation of calcium and magnesium scale upon internal surfaces of a cooling water system which consists essentially of the step of treating said cooling water with a synergistic composition comprising a condensed ammonium or alkali metal phosphate and an acrylic polymer having a molecular weight of up to 40,000 and having amide and carboxyl groups in a ratio of one to four amide groups per six to nine carboxyl groups, said phosphate and said polymer being present in a weight ratio varying from about 10:1 to about 1:10.

9. The method of claim 8 wherein the said weight ration varies from about 5:1 to about 1:5.

10. The method of claim 8 wherein said polymer is a hydrolyzed polyacrylonitrile having a molecular weight ranging from about 800 to about 40,000.

11. The method of claim 8 wherein said cooling water system is treated with said composition in an amount ranging from 0.5 to about 10 p.p.m.

12. A synergistic stabilizing composition comprising a condensed ammonium or alkali metal phosphate and a polymer having a molecular weight of from 800 to 40,000 and having amide and carboxyl groups in a ratio of one to four amide groups per six to nine carboxyl groups, said phosphate and said polymer being present in said composition in a weight ratio ranging from about 10:1 to about 1:10.

13. The composition of claim 12 wherein said weight ratio ranges from about 5:1 to about 1:5.

14. The composition of claim 13 wherein said polymer is a hydrolyzed polyacrylonitrile having a molecular weight of from 10,000 to 30,000.

References Cited

UNITED STATES PATENTS

| | | | |
|---|---|---|---|
| 2,718,497 | 9/1955 | Oldham | 252—8.5 |
| 2,783,200 | 2/1957 | Crum | 210—23 |
| 2,812,317 | 11/1957 | Barrett | 260—88.7 |
| 3,331,773 | 7/1967 | Gunderson | 210—58 |

HAROLD ANSHER, Primary Examiner

M. E. McCAMISH, Assistant Examiner

U.S. Cl. X.R.

252—8.55, 82; 260—88.7

UNITED STATES PATENT OFFICE
CERTIFICATE OF CORRECTION

Patent No. 3,549,548  Dated December 22, 1970

Inventor(s) Theodore R. Newman

It is certified that error appears in the above-identified patent and that said Letters Patent are hereby corrected as shown below:

Column 3, line 2, "$(NH_4)_2P_2O_7$" should read -- $(NH_4)_2H_2P_2O_7$ --.

Column 4, line 9, "polyacryolnitrile" should read -- polyacrylonitrile --.

Signed and sealed this 20th day of April 1971.

(SEAL)
Attest:

EDWARD M. FLETCHER, JR.  WILLIAM E. SCHUYLER, JR.
Attesting Officer  Commissioner of Patents

PO-1050
(5/69)

UNITED STATES PATENT OFFICE
CERTIFICATE OF CORRECTION

Patent No. 3,549,548          Dated December 22, 1970

Inventor(s) Theodore R. Newman

It is certified that error appears in the above-identified patent and that said Letters Patent are hereby corrected as shown below:

Column 3, line 2, "$(NH_4)_2P_2O_7$" should read -- $(NH_4)_2H_2P_2O_7$

Column 4, line 9, "polyacryolnitrile" should read -- polyacrylonitrile --.

Signed and sealed this 20th day of April 1971.

(SEAL)
Attest:

EDWARD M. FLETCHER, JR.
Attesting Officer

WILLIAM E. SCHUYLER, JR.
Commissioner of Patents